United States Patent
Chen et al.

(10) Patent No.: US 10,313,258 B2
(45) Date of Patent: Jun. 4, 2019

(54) PACKET PROCESSING METHOD AND APPARATUS

(71) Applicant: Huawei Technologies Co., Ltd., Shenzhen (CN)

(72) Inventors: Cong Chen, Shenzhen (CN); Zhu Cheng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 15/818,162

(22) Filed: Nov. 20, 2017

(65) Prior Publication Data

US 2018/0077076 A1    Mar. 15, 2018

Related U.S. Application Data

(63) Continuation of application No. PCT/CN2015/079716, filed on May 25, 2015.

(51) Int. Cl.
| | |
|---|---|
| *H04L 12/875* | (2013.01) |
| *H04L 12/54* | (2013.01) |
| *G06F 5/06* | (2006.01) |
| *H04L 12/26* | (2006.01) |
| *H04L 12/863* | (2013.01) |
| *H04W 88/08* | (2009.01) |

(Continued)

(52) U.S. Cl.
CPC ............... *H04L 47/56* (2013.01); *G06F 5/06* (2013.01); *H04L 12/54* (2013.01); *H04L 43/0858* (2013.01); *H04J 3/0667* (2013.01); *H04L 47/22* (2013.01); *H04L 47/50* (2013.01); *H04L 49/901* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 8,386,828 B1 * | 2/2013 | Ambatipudi | ......... | H03K 21/023 326/96 |
| 9,094,307 B1 * | 7/2015 | Edsall | ................... | H04L 43/028 |

(Continued)

FOREIGN PATENT DOCUMENTS

| | | |
|---|---|---|
| CN | 102781060 A | 11/2012 |
| CN | 103677732 A | 3/2014 |

(Continued)

OTHER PUBLICATIONS

IEEE, "IEEE Standard for a Precision Clock Synchronization Protocol for Networked Measurement and Control Systems," IEEE Instrumentation and Measurement Society, Std 1588™-2008, Jul. 24, 2008, 289 pages.

(Continued)

*Primary Examiner* — Mohammad S Adhami
(74) *Attorney, Agent, or Firm* — Slater Matsil, LLP

(57) ABSTRACT

Embodiments of the present invention provide a packet processing method and apparatus. After receiving a packet, a first network device processes the packet, and determines a first latency of the processed packet in a FIFO memory, where: the first latency is equal to a difference obtained by subtracting a second latency from a target latency, the second latency includes a third latency, and the third latency includes a time interval for processing the packet.

20 Claims, 8 Drawing Sheets

(51) Int. Cl.
  *H04L 12/815* (2013.01)
  *H04L 12/879* (2013.01)
  *H04J 3/06* (2006.01)

(56) References Cited

U.S. PATENT DOCUMENTS

| | | | |
|---|---|---|---|
| 2004/0057539 A1* | 3/2004 | Boles | H04J 3/0682 |
| | | | 375/354 |
| 2004/0151170 A1 | 8/2004 | Gulati et al. | |
| 2007/0220184 A1* | 9/2007 | Tierno | G06F 5/12 |
| | | | 710/52 |
| 2009/0257441 A1 | 10/2009 | Hata et al. | |
| 2014/0089720 A1* | 3/2014 | Schmit | H04L 7/005 |
| | | | 713/501 |
| 2015/0205579 A1* | 7/2015 | Mendel | G06F 5/14 |
| | | | 710/57 |
| 2017/0270984 A1* | 9/2017 | Xin | G06F 5/06 |

FOREIGN PATENT DOCUMENTS

| | | |
|---|---|---|
| CN | 103684902 A | 3/2014 |
| EP | 2416506 A1 | 2/2012 |
| WO | 2014154822 A1 | 10/2014 |

OTHER PUBLICATIONS

"Common Public Radio Interface (CPRI); Interface Specification," CPRI Specification V6.0 (Aug. 30, 2013), 128 pages'.

* cited by examiner

PACKET PROCESSING METHOD AND APPARATUS

CROSS-REFERENCE TO RELATED APPLICATIONS

This application is a continuation of International Application No. PCT/CN2015/079716, filed on May 25, 2015, the disclosure of which is hereby incorporated by reference in its entirety.

TECHNICAL FIELD

The present invention relates to the field of communications technologies, and in particular, to a packet processing method and apparatus.

BACKGROUND

A packet may need to pass through a forwarding device when being transmitted in a network. A latency may be generated when the packet passes through the forwarding device. A latency of the packet in a transmission path may include the latency generated when the packet passes through the forwarding device. Latencies generated when different packets pass through the forwarding device may be unequal. Therefore, latencies of the different packets in a transmission path may be unequal.

The foregoing case may be caused because processing performed by the forwarding device on the different packets is different. For example, when the forwarding device performs table lookup operations according to the different packets, time intervals needed for the table lookup operations corresponding to the different packets may be unequal.

A phenomenon that latencies of different packets in a transmission path are unequal may be referred to as latency variation. Latency variation is unacceptable for some services. For example, a CPRI (Common Public Radio Interface) service, an SDH (Synchronous Digital Hierarchy) service, or a PDH (plesiochronous digital hierarchy) service that is transmitted between a BBU (Baseband Unit) and an RRU (Remote Radio Unit) imposes a strict requirement on a latency of a packet.

In the prior art, a latency generated when a packet passes through a forwarding device cannot be enabled to be equal to a certain value.

SUMMARY

According to a packet processing method and apparatus provided in embodiments, a latency generated when a packet passes through a forwarding device may be equal to a certain value.

According to a first aspect, a packet processing method is provided. The method includes: receiving, by a first network device, a packet at a first time. The method also includes processing, by the first network device, the packet to obtain a processed packet, and writing the processed packet into a buffer memory. The method also includes reading, by the first network device, the processed packet from the buffer memory at a second time. The method also includes determining, by the first network device at a time after the second time, a first latency of the processed packet in a first in first out FIFO memory, where the first latency is equal to a difference obtained by subtracting a second latency from a target latency, the target latency is equal to a period from the first time to a third time at which the processed packet is forwarded by the first network device through an egress port, the second latency is equal to a sum of a third latency and a fourth latency, the third latency is equal to a period from the first time to the second time, the fourth latency is a fixed latency, and the FIFO memory includes multiple contiguous storage units. The method also includes setting, by the first network device, a read pointer and/or a write pointer according to the determined first latency. The method also includes writing, by the first network device according to the set write pointer, the processed packet into a storage unit in the FIFO memory, or reading, according to the set read pointer, the processed packet from a storage unit in the FIFO memory. The method also includes forwarding, by the first network device at the third time through the egress port, the processed packet that is read from the FIFO memory.

With reference to the first aspect, in a first possible implementation manner of the first aspect, the setting, by the first network device, a write pointer according to the determined first latency specifically includes: determining, by the first network device according to the first latency, a location of the storage unit in the FIFO memory; and setting, by the first network device, the write pointer according to the determined location of the storage unit, where the set write pointer points to the storage unit.

With reference to the first possible implementation manner of the first aspect, in a second possible implementation manner of the first aspect, the determining, by the first network device according to the first latency, a location of the storage unit in the FIFO memory specifically includes: determining, by the first network device, the location of the storage unit in the FIFO memory according to the following formula:

$$P\_add = \left\lceil \frac{T_1}{T_{read}} \right\rceil - 1,$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

With reference to the first aspect or either of the first to second possible implementation manners of the first aspect, in a third possible implementation manner of the first aspect, a clock frequency at which the write pointer performs a write operation on the FIFO memory and a clock frequency at which the read pointer performs a read operation on the FIFO memory are synchronous; and a clock phase at which the write pointer performs a write operation on the FIFO memory and a clock phase at which the read pointer performs a read operation on the FIFO memory are synchronous.

With reference to the first aspect or the first to third possible implementation manners of the first aspect, in a fourth possible implementation manner of the first aspect, the receiving, by a first network device, a packet at a first time includes: receiving, by the first network device at the first time, the packet that is from a remote radio unit RRU;

or receiving, by the first network device at the first time, the packet that is from a baseband unit BBU.

According to a second aspect, a packet processing method is provided. The method includes receiving, by a first network device, a packet that is from a second network device, where the packet carries a first time, and the first time is a time at which the second network device receives the packet. The method also includes processing, by the first network device, the packet to obtain a processed packet, and writing the processed packet into a buffer memory. The method also includes reading, by the first network device, the processed packet from the buffer memory at a second time. The method also includes determining, by the first network device at a time after the second time, a first latency of the processed packet in a first in first out FIFO memory, where the first latency is equal to a difference obtained by subtracting a second latency from a target latency, the target latency is equal to a period from the first time to a third time at which the processed packet is forwarded by the first network device through an egress port, the second latency is equal to a sum of a third latency and a fourth latency, the third latency is equal to a period from the first time to the second time, the fourth latency is a fixed latency, and the FIFO memory includes multiple contiguous storage units. The method also includes setting, by the first network device, a read pointer and/or a write pointer according to the determined first latency. The method also includes writing, by the first network device according to the set write pointer, the processed packet into a storage unit in the FIFO memory, or reading, according to the set read pointer, the processed packet from a storage unit in the FIFO memory. The method also includes forwarding, by the first network device at the third time through the egress port, the processed packet that is read from the FIFO memory.

With reference to the second aspect, in a first possible implementation manner of the second aspect, the setting, by the first network device, a write pointer according to the first latency specifically includes: determining, by the first network device according to the first latency, a location of the storage unit in the FIFO memory; and setting, by the first network device according to the determined location of the storage unit, the write pointer to point to the storage unit.

With reference to the first possible implementation manner of the second aspect, in a second possible implementation manner of the second aspect, the determining, by the first network device according to the first latency, a location of the storage unit in the FIFO memory specifically includes: determining, by the first network device, the location of the storage unit in the FIFO memory according to the following formula:

$$\text{P\_add} = \left\lceil \frac{T_1}{T_{read}} \right\rceil - 1,$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

With reference to the second aspect or either of the first to second possible implementation manners of the second aspect, in a third possible implementation manner of the second aspect, the Precision Time Protocol or the Network Time Protocol is used to perform time synchronization between the first network device and the second network device.

With reference to the second aspect or any one of the first to third possible implementation manners of the second aspect, in a fourth possible implementation manner of the second aspect, the receiving, by a first network device, a packet includes: receiving, by the first network device, the packet that is from a remote radio unit RRU; or receiving, by the first network device, the packet that is from a baseband unit BBU.

According to a third aspect, a packet processing apparatus is provided. The apparatus includes a receiving unit, configured to receive a packet at a first time. The apparatus also includes a processing unit, configured to process the packet received by the receiving unit to obtain a processed packet, and write the processed packet into a buffer memory. The apparatus also includes a reading unit, configured to read, from the buffer memory at a second time, the processed packet obtained by the processing unit. The apparatus also includes a first latency determining unit, configured to determine, at a time after the second time, a first latency of the processed packet in a first in first out FIFO memory, where the first latency is equal to a difference obtained by subtracting a second latency from a target latency, the target latency is equal to a period from the first time to a third time at which the processed packet is forwarded by a forwarding unit through an egress port, the second latency is equal to a sum of a third latency and a fourth latency, the third latency is equal to a period from the first time to the second time, the fourth latency is a fixed latency, and the FIFO memory includes multiple contiguous storage units. The apparatus also includes a setting unit, configured to: set a read pointer and/or a write pointer according to the first latency determined by the first latency determining unit; and write, according to the set write pointer, the processed packet into a storage unit in the FIFO memory, or read, according to the set read pointer, the processed packet from a storage unit in the FIFO memory. The apparatus also includes the forwarding unit, configured to forward, at the third time through the egress port, the processed packet that is read from the FIFO memory.

With reference to the third aspect, in a first possible implementation manner of the third aspect, the setting unit is specifically configured to: determine, according to the first latency, a location of the storage unit in the FIFO memory; and set the write pointer according to the determined location of the storage unit, where the set write pointer points to the storage unit.

With reference to the first possible implementation manner of the third aspect, in a second possible implementation manner of the third aspect, the setting unit is specifically configured to: determine the location of the storage unit in the FIFO memory according to the following formula:

$$\text{P\_add} = \left\lceil \frac{T_1}{T_{read}} \right\rceil - 1,$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

With reference to the third aspect or either of the first to second possible implementation manners of the third aspect, in a third possible implementation manner of the third aspect, a clock frequency at which the write pointer performs a write operation on the FIFO memory and a clock frequency at which the read pointer performs a read operation on the FIFO memory are synchronous; and a clock phase at which the write pointer performs a write operation on the FIFO memory and a clock phase at which the read pointer performs a read operation on the FIFO memory are synchronous.

With reference to the third aspect or the first to third possible implementation manners of the third aspect, in a fourth possible implementation manner of the third aspect, the receiving unit is specifically configured to: receive, at the first time, the packet that is from a remote radio unit RRU; or receive, at the first time, the packet that is from a baseband unit BBU.

According to a fourth aspect, a packet processing apparatus is provided. The apparatus includes a receiving unit, configured to receive a packet that is from a second network device, where the packet carries a first time, and the first time is a time at which the second network device receives the packet. The apparatus also includes a processing unit, configured to process the packet received by the receiving unit to obtain a processed packet, and write the processed packet into a buffer memory. The apparatus also includes a reading unit, configured to read, from the buffer memory at a second time, the processed packet obtained by the processing unit. The apparatus also includes a first latency determining unit, configured to determine, at a time after the second time, a first latency of the processed packet read by the reading unit in a first in first out FIFO memory, where the first latency is equal to a difference obtained by subtracting a second latency from a target latency, the target latency is equal to a period from the first time to a third time at which the processed packet is forwarded by a forwarding unit through an egress port, the second latency is equal to a sum of a third latency and a fourth latency, the third latency is equal to a period from the first time to the second time, the fourth latency is a fixed latency, and the FIFO memory includes multiple contiguous storage units. The apparatus also includes a setting unit, configured to: set a read pointer and/or a write pointer according to the first latency determined by the first latency determining unit; and write, according to the set write pointer, the processed packet into a storage unit in the FIFO memory, or read, according to the set read pointer, the processed packet from a storage unit in the FIFO memory. The apparatus also includes the forwarding unit, configured to forward, at the third time through the egress port, the processed packet that is read from the FIFO memory.

With reference to the fourth aspect, in a first possible implementation manner of the fourth aspect, the setting unit is specifically configured to: determine, according to the first latency, a location of the storage unit in the FIFO memory; and set, according to the determined location of the storage unit, the write pointer to point to the storage unit.

With reference to the first possible implementation manner of the fourth aspect, in a second possible implementation manner of the fourth aspect, the setting unit is specifically configured to: determine the location of the storage unit in the FIFO memory according to the following formula:

$$P\_add = \left\lceil \frac{T_1}{T_{read}} \right\rceil - 1,$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

With reference to the fourth aspect or either of the first to second possible implementation manners of the fourth aspect, in a third possible implementation manner of the fourth aspect, the Precision Time Protocol or the Network Time Protocol is used to perform time synchronization between the apparatus and the second network device.

With reference to the fourth aspect or the first to third possible implementation manners of the fourth aspect, in a fourth possible implementation manner of the fourth aspect, the receiving unit is specifically configured to: receive the packet that is from a remote radio unit RRU; or receive the packet that is from a baseband unit BBU.

According to a method and an apparatus that are provided in the embodiments, after receiving a packet, a first network device processes the packet and determines a first latency of the processed packet in a FIFO memory, where: the first latency is equal to a difference obtained by subtracting a second latency from a target latency, the second latency includes a third latency, and the third latency includes a time interval for processing the packet. That is, the time interval for processing the packet is taken into consideration in determining of the first latency. In addition, the determining of the first latency enables a latency generated when the packet passes through the first network device to be equal to the target latency. Therefore, in the foregoing technical solutions, a latency generated when a packet passes through a network device may be enabled to be equal to a certain value.

DETAILED DESCRIPTION OF ILLUSTRATIVE EMBODIMENTS

The following describes the embodiments in detail with reference to the accompanying drawings for the specification.

Figure 1:
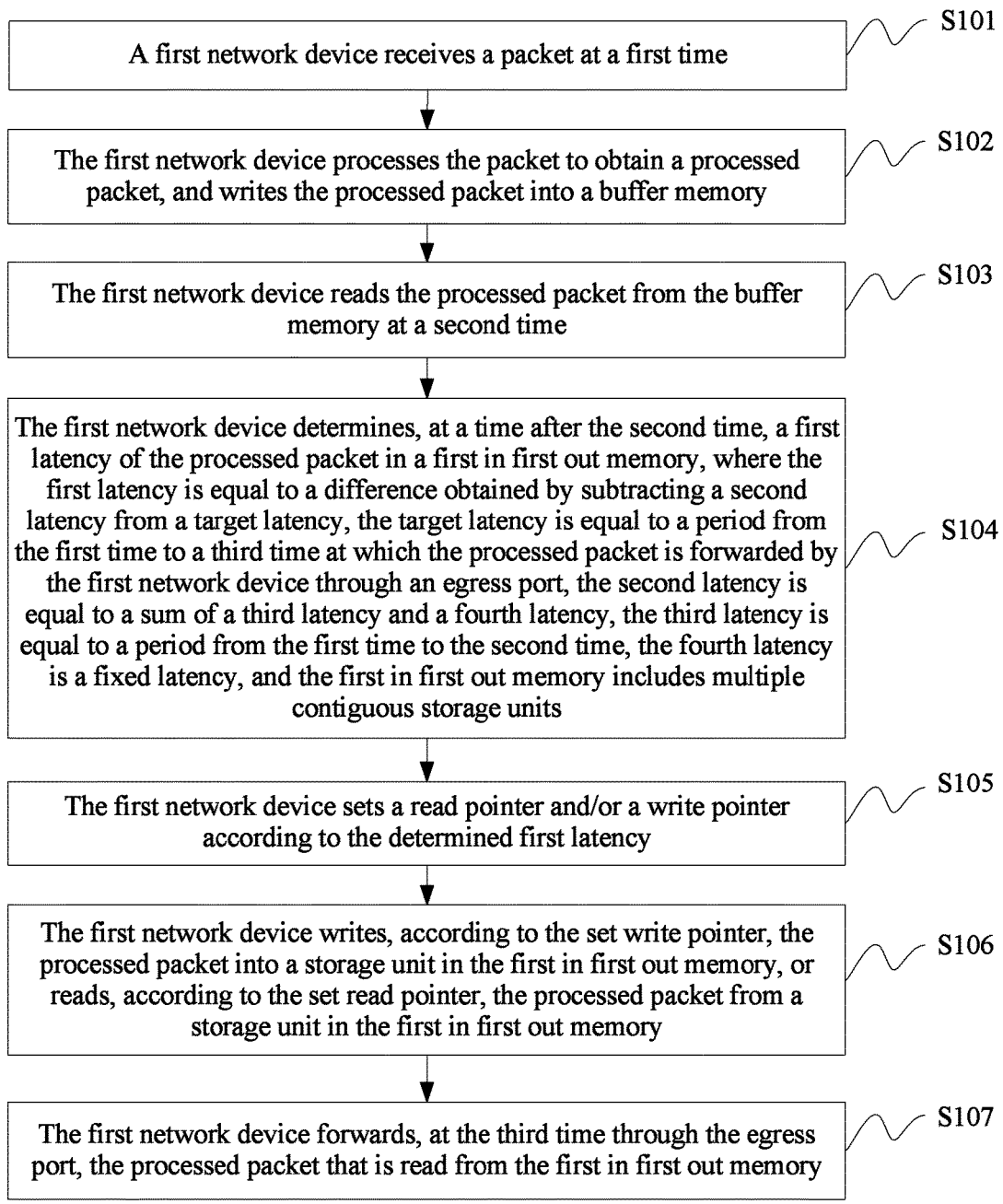
FIG. 1 is a schematic flowchart of a packet processing method according to an embodiment of the present invention.

As shown in FIG. 1. FIG. 1 is a schematic flowchart of a packet processing method according to an embodiment of the present invention. The method includes the following steps.

S101. A first network device receives a packet at a first time.

For example, the first network device may be a PTN (Packet Transport Network) device, an OTN (Optical Transport Network) device, a router, or a switch.

The first time in this embodiment of the present invention is a time at which the first network device receives the packet.

For example, a service carried by the packet may be a CPRI service, an SDH service, or a PDH service.

For example, when receiving the packet at the first time, the first network device may record the first time at which the packet is received.

For example, when receiving the packet at the first time, the first network device may record the first time in a packet header of the packet. The first network device may determine, by reading the packet header of the packet, the first time at which the packet is received.

For example, when receiving the packet at the first time, the first network device may also record the first time in a storage medium of the first network device. The first network device may determine, by reading the first time from the storage medium, a time at which the packet is received.

For example, S101 may be performed by a receiver circuit in the first network device. The receiver circuit may be configured to implement an Ethernet interface.

S102. The first network device processes the packet to obtain a processed packet, and writes the processed packet into a buffer memory.

For example, the processing performed by the first network device on the packet may be coding, decoding, encryption, or decryption. When the packet is an Ethernet frame, the processing may be determining, by searching a Media Access Control (MAC) protocol table, an egress port for forwarding the packet. When the packet is an Internet Protocol (IP) packet, the processing may be determining, by searching a routing table, an egress port for forwarding the packet.

The buffer memory is a memory for storing the processed packet. The buffer memory may be a component of the first network device, and is a memory located inside the first network device. Alternatively, the buffer memory may be a memory located outside the first network device. The buffer memory may be coupled to the receiver circuit.

For example, S102 may be performed by an instruction execution circuit in the first network device. The instruction execution circuit may perform the processing on the packet according to an instruction. The instruction execution circuit may be implemented by using a network processor (NP) or an application-specific integrated circuit (ASIC).

S103. The first network device reads the processed packet from the buffer memory at a second time.

For example, S103 may be performed by the instruction execution circuit in the first network device.

S104. The first network device determines, at a time after the second time, a first latency of the processed packet in a first in first out memory, where the first latency is equal to a difference obtained by subtracting a second latency from a target latency, the target latency is equal to a period from the first time to a third time at which the processed packet is forwarded by the first network device through an egress port, the second latency is equal to a sum of a third latency and a fourth latency, the third latency is equal to a period from the first time to the second time, the fourth latency is a fixed latency, and the first in first out memory includes multiple contiguous storage units.

For example, the multiple contiguous storage units in the FIFO (First In First Out) memory may be configured to store a packet queue. Each storage unit is configured to store one packet or null data. The packet queue includes at least one packet. When the packet queue includes multiple packets, in the packet queue, a location of a packet that is among the multiple packets and that is written by the FIFO memory at an earlier time is in front of a location of a packet that is among the multiple packets and that is written by the FIFO memory at a later time.

For example, in order to avoid latency variation from being generated when the multiple packets pass through the first network device, target latencies of all packets in the multiple packets in the first network device are equal.

For example, a value of the target latency may be statically configured by an engineer by using the first network device. A value of the target latency may be equal to a fixed value. For example, the engineer configures the target latency for the first network device by using a telnet. The engineer may determine the target latency for the first network device by means of an experiment. If the first network device does not enable functions corresponding to S104 and S106, the following operation is performed on a packet, used for the experiment, passing through the first network device: receiving, through an ingress port, the packet used for the experiment; processing, by the first network device, the packet used for the experiment, thereby obtaining a processed packet used for the experiment; writing the processed packet used for the experiment into the buffer memory; reading the processed packet used for the experiment from the buffer memory; writing the processed packet used for the experiment into the FIFO memory; reading the processed packet used for the experiment from the FIFO memory; and forwarding the processed packet used for the experiment through an egress port. It should be noted that, in the foregoing operations, a step of determining the first latency is not performed. Further, a write pointer used for writing the processed packet used for the experiment into the FIFO memory is not set according to the first latency. A read pointer used for reading the processed packet used for the experiment from the FIFO memory is not set according to the first latency, either. The first network device may be capable of processing multiple services. The multiple services are corresponding to multiple packets. The packet used for the experiment may include the multiple packets. For example, the first network device can process a service 1, a service 2, and a service 3. The multiple packets are a packet 1, a packet 2, and a packet 3. The packet 1, the packet 2, and the packet 3 are corresponding to the service 1, the service 2, and the service 3, respectively. Latencies generated when the packet 1, the packet 2, and the packet 3 pass through the first network device are 3 ms, 4 ms, and 5 ms, respectively. A difference between latencies corresponding to different packets is caused because time intervals occupied by the first network device for processing packets of different services are different. For example, time intervals occupied by the first network device for processing the packet 1, the packet 2, and the packet 3 are 0.5 ms, 1 ms, and 2 ms, respectively. Specifically, a period from a time at which the first network device receives the packet 1 through the ingress port to a time at which the first network device writes the processed packet 1 into the buffer memory is 0.5 ms. A period from a time at which the first network device receives the packet 2 through the ingress port to a time at which the first network device writes the processed packet 2 into the buffer memory is 1 ms. A period from a time at which the first network device receives the packet 3 through the ingress port to a time at which the first network device writes the processed packet 3 into the buffer memory is 2 ms.

According to the foregoing experiment, the engineer may determine the target latency as a maximum value of a latency generated when the packet used for the experiment passes through the first network device, that is, 5 ms. Certainly, the engineer may also determine the target latency as a value greater than the maximum value of the latency generated when the packet used for the experiment passes through the first network device. For example, the target latency is set as 6 ms or 7 ms. In this way, after enabling the functions corresponding to S104 and S106 and receiving the different packets, the first network device may implement, by controlling time intervals, that is, the first latency, of the different packets in the FIFO memory, that all latencies generated when the different packets pass through the first network device are equal to the target latency. For example, all latencies generated when the different packets pass through the first network device are equal to 6 ms.

For example, the target latency of the packet in the first network device includes three parts: the first latency, the third latency, and the fourth latency. The first network device may enable, by determining the first latency of the processed packet in the FIFO memory, a value of the target latency of the packet in the first network device to be the value that is statically configured.

For example, the first network device may determine, by setting the read pointer and/or the write pointer that are/is of the FIFO memory, the first latency of the packet in the FIFO memory.

For example, the third latency is equal to a difference between the second time and the first time.

For example, the fourth latency is a fixed latency, and may depend on a hardware structure of the first network device. Specifically, the buffer memory may connect to the FIFO memory by using a transmission medium. The FIFO memory may connect to the egress port by using a transmission medium. After the first network device is created, the transmission medium between the buffer memory and the FIFO memory is determined, that is, a physical attribute of the transmission medium between the buffer memory and the FIFO memory is determined. Therefore, a time interval for transmitting a signal over the transmission medium between the buffer memory and the FIFO memory is a fixed value. Likewise, a time interval for transmitting a signal over the transmission medium between the FIFO memory and the egress port is also a fixed value.

S105. The first network device sets a read pointer and/or a write pointer according to the determined first latency.

For example, the setting the read pointer may be specifically setting a value of the read pointer. The setting the write pointer may be specifically setting a value of the write pointer.

For example, the read pointer of the FIFO memory is configured to perform a read operation on a storage unit in the FIFO memory. The write pointer of the FIFO memory is configured to perform a write operation on a storage unit in the FIFO memory.

For example, the first network device may determine, according to the first latency, a storage unit to which the read pointer points, so as to set the value of the read pointer to an address of the storage unit. Alternatively, the first network device may determine, according to the first latency, a storage unit to which the write pointer points, so as to set the value of the write pointer to an address of the storage unit. Alternatively, the first network device may determine, according to the first latency, a storage unit to which the read pointer and the write pointer point, so as to set values of the read pointer and the write pointer to an address of the storage unit.

S106. The first network device writes, according to the set write pointer, the processed packet into a storage unit in the first in first out memory, or reads, according to the set read pointer, the processed packet from a storage unit in the first in first out memory.

For example, after a read operation is performed on the storage unit to which the read pointer of the FIFO memory points, the value of the read pointer is increased by 1. The read pointer whose value is increased by 1 points to a next storage unit from which a packet is to be read.

For example, after a write operation is performed on the storage unit to which the write pointer of the FIFO memory points, the value of the write pointer is increased by 1. The write pointer whose value is increased by 1 points to a next storage unit into which a packet is to be written.

For example, the read operation corresponding to the read pointer and the write operation corresponding to the write pointer may be performed synchronously, or may be performed asynchronously.

For example, the first network device performs a write operation on the storage unit according to the set write pointer, so as to write the processed packet into the storage unit. The first network device performs a read operation on the storage unit according to the set read pointer, so as to read the processed packet from the storage unit.

S107. The first network device forwards, at the third time through the egress port, the processed packet that is read from the FIFO memory.

For example, the FIFO memory performs a read operation to read the processed packet from the storage unit to which the read pointer points.

For example, S107 may be performed by a transmitter circuit in the first network device, and the FIFO memory is a component of the first network device. The transmitter circuit is coupled to the FIFO memory.

Figure 2:
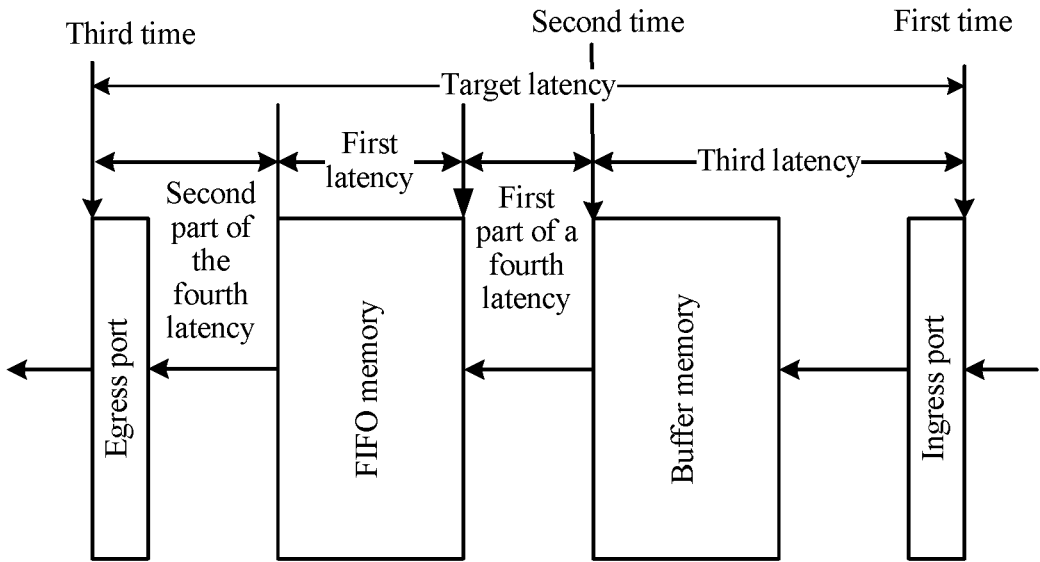
FIG. 2 is a schematic diagram of a latency generated when a packet passes through a first network device according to an embodiment of the present invention.

FIG. 2 is a schematic diagram of a latency generated when the packet passes through the first network device, in the method shown in FIG. 1, according to an embodiment. Referring to FIG. 2, the packet enters the first network device at the first time, through the ingress port. The packet leaves the first network device at the third time through the egress port. The latency generated when the packet passes through the first network device is equal to the target latency. The target latency is a period from the first time to the third time. The target latency includes the first latency, the third latency, and the fourth latency.

The third latency is equal to a period from the first time to the second time. The first time is a time at which the first network device receives the packet through the ingress port. The second time is a time at which the first network device reads the processed packet from the buffer memory. During a period from a time at which the packet is received through the ingress port to a time at which the packet enters the buffer memory, the first network device processes the packet. For example, the first network device may process the packet by using a network processor (not shown in the figure).

The first latency is equal to a period from a time at which the processed packet is written into the FIFO memory to a time at which the processed packet is read from the FIFO memory.

The fourth latency is a fixed latency. The fourth latency includes a first part and a second part. The first part is a period from a time at which the processed packet is read from the buffer memory to a time at which the processed packet is written into the FIFO memory. The second part is equal to a period from the time at which the processed packet is read from the FIFO memory to a time at which the processed packet is forwarded through the egress port.

Figure 3:
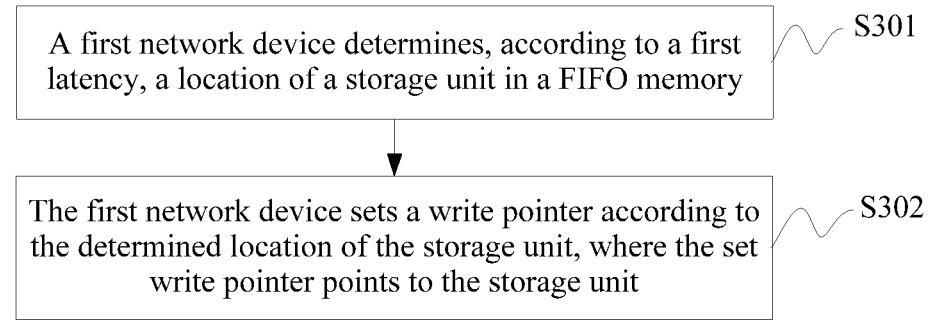
FIG. 3 is a schematic flowchart of a packet processing method according to an embodiment of the present invention.

FIG. 3 is a schematic flowchart of a packet processing method according to an embodiment of the present invention. Referring to FIG. 3, the method includes S301 and S302.

Optionally, in the method shown in FIG. 1, that the first network device sets a write pointer according to the determined first latency specifically includes the following steps.

S301. The first network device determines, according to the first latency, a location of the storage unit in the FIFO memory.

S302. The first network device sets the write pointer according to the determined location of the storage unit, where the set write pointer points to the storage unit.

For S301 and S302, refer to FIG. 3 for details.

Optionally, in the method shown in FIG. 3, that the first network device determines, according to the first latency, a location of the storage unit in the FIFO memory specifically includes: determining, by the first network device, the location of the storage unit in the FIFO memory according to the following formula:

$$P\_add = \left\lceil \frac{T_1}{T_{read}} \right\rceil - 1 \quad (1)$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle (clock cycle) in which the write pointer performs a write operation on the FIFO memory; and $\lceil \cdot \rceil$ indicates round-up.

Optionally, in the method shown in FIG. 1, a clock frequency at which the write pointer performs a write operation on the FIFO memory and a clock frequency at which the read pointer performs a read operation on the FIFO memory are synchronous.

A clock phase at which the write pointer performs a write operation on the FIFO memory and a clock phase at which the read pointer performs a read operation on the FIFO memory are synchronous.

In the foregoing solution, inequality between a rate at which data is written when the FIFO memory performs the write operation and a rate at which the data is read when the FIFO memory performs the read operation can be avoided. The inequality between the rate at which data is written and the rate at which the data is read may cause a data loss.

Optionally, in the method shown in FIG. 1, S101 may be specifically that the first network device receives, at the first time, the packet that is from an RRU.

Optionally, in the method shown in FIG. 1, S101 may be specifically that the first network device receives, at the first time, the packet that is from a BBU.

For example, the first network device is a network device between the BBU and the RRU. The first network device is configured to connect the BBU and the RRU. Alternatively, multiple RRUs connect to one BBU by using the first network device. In the foregoing solution, it can be avoided that each RRU needs to be directly connected to the BBU by using an optical fiber, which helps reduce optical fibers and reduce costs. In addition, a latency generated when the packet passes through the first network device is equal to a target latency. A value of the target latency may be equal to a fixed value. When multiple packets pass through the first network device, the first network device may perform a similar operation on each packet, that is, the first network device may perform operations of S101 to S107 on each packet. Therefore, latencies generated when all packets pass through the first network device may be equal to the target latency. Therefore, when being configured to connect the BBU and the RRU, the first network device may be configured to forward a packet that is used to carry a CPRI service, an SDH service, or a PDH service. The foregoing solution can reduce latency variation.

According to the method described above, after receiving a packet, a first network device determines, according to a target latency set by the first network device, a first latency of a processed packet in a FIFO memory, which enables a latency of the packet in the first network device to be equal to the target latency.

Latency variation may also be generated in a process in which multiple packets pass through multiple network devices. To avoid latency variation from being generated in the process in which the multiple packets pass through the multiple network devices, latencies generated when the multiple packets separately pass through the multiple network devices may be determined as a same target latency. For details, refer to the following description.

Figure 4:
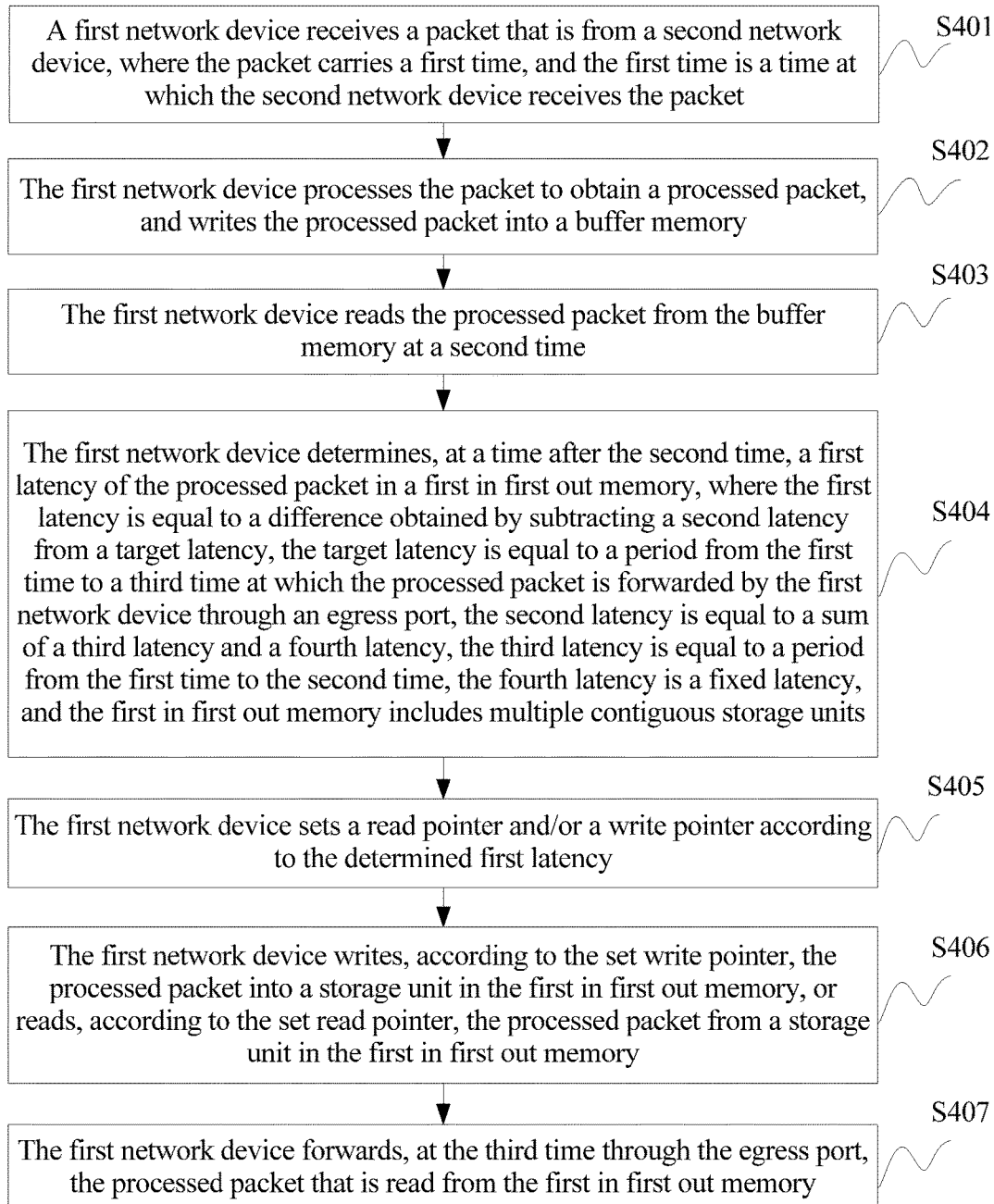
FIG. 4 is a schematic flowchart of a packet processing method according to an embodiment of the present invention.

FIG. 4 is a schematic flowchart of a packet processing method according to an embodiment of the present invention. The method includes the following steps.

S401. A first network device receives a packet that is from a second network device, where the packet carries a first time, and the first time is a time at which the second network device receives the packet.

For example, the first network device and the second network device may be a PTN device, an OTN device, a router, or a switch.

For example, an intermediate network device may be disposed between the first network device and the second network device. That is, the first network device and the second network device may be indirectly connected. The intermediate network device may be a repeater.

For example, an intermediate network device may not be disposed between the first network device and the second network device. That is, the first network device and the second network device may be directly connected. Specifically, the first network device and the second network device may be connected by using only a transmission medium. The transmission medium may be a cable or an optical cable.

In this embodiment of the present invention, the first time is a time at which the second network device receives the packet.

For example, a service carried by the packet may be a CPRI service, an SDH service, or a PDH service.

For example, after receiving the packet, the second network device may record the first time in a packet header of the packet. The first network device may determine, by reading the packet header of the packet, the first time at which the second network device receives the packet.

For example, the second network device may record the first time in the packet header of the packet by using a receiver circuit in the second network device.

For example, S401 may be performed by a receiver circuit in the first network device. The receiver circuit may be configured to implement an Ethernet interface.

S402. The first network device processes the packet to obtain a processed packet, and writes the processed packet into a buffer memory.

For example, the processing performed by the first network device on the packet may be coding, decoding, encryption, or decryption.

When the packet is an Ethernet frame, the processing may be determining, by searching a MAC protocol table, an egress port for forwarding the packet. When the packet is an IP packet, the processing may be determining, by searching a routing table, an egress port for forwarding the packet.

The buffer memory is a memory for storing the processed packet. The buffer memory may be a component of the first network device. The buffer memory may be coupled to the receiver circuit.

For example, the buffer memory may be a memory located inside the first network device, or may be a memory located outside the first network device.

S403. The first network device reads the processed packet from the buffer memory at a second time.

In S403, a time at which the first network device reads the processed packet from the buffer memory is the second time.

For example, S403 may be performed by an instruction execution circuit. The instruction execution circuit may perform the processing on the packet according to an instruction. The instruction execution circuit may be implemented by using a network processor or an application-specific integrated circuit.

S404. The first network device determines, at a time after the second time, a first latency of the processed packet in a first in first out memory, where the first latency is equal to a difference obtained by subtracting a second latency from a target latency, the target latency is equal to a period from the first time to a third time at which the processed packet is forwarded by the first network device through an egress port, the second latency is equal to a sum of a third latency and a fourth latency, the third latency is equal to a period from the first time to the second time, the fourth latency is a fixed latency, and the first in first out memory includes multiple contiguous storage units.

For example, the multiple contiguous storage units in the FIFO memory are configured to store a packet queue, and each storage unit is configured to store one packet or null data. The packet queue includes at least one packet. When the packet queue includes multiple packets, in the packet queue, a location of a packet that is among the multiple packets and that is written by the FIFO memory at an earlier time is in front of a location of a packet that is among the multiple packets and that is written by the FIFO memory at a later time.

For example, in order to avoid latency variation from being generated when the multiple packets pass through the second network device and the first network device, target latencies of all packets in the multiple packets are equal.

For example, a value of the target latency is equal to a fixed value. The value of the target latency is statically configured by an engineer by using the first network device. A method for configuring the target latency is similar to the method described in S104. For details, refer to the description in step S104, and details are not described herein again.

For example, the target latency of the packet includes three parts: the first latency, the third latency, and the fourth latency. The first network device enables, by determining the first latency of the processed packet in the FIFO memory of the first network device, a value of the target latency of the packet to be the value that is statically configured.

For example, the first network device may determine, by setting a read pointer and/or a write pointer that are/is of the FIFO memory, the first latency of the packet in the FIFO memory of the first network device.

For example, the third latency is equal to a difference between the second time and the first time.

For example, the fourth latency is a fixed latency, and may depend on a hardware structure of the first network device. Specifically, the buffer memory may connect to the FIFO memory by using a transmission medium. The FIFO memory may connect to the egress port by using a transmission medium. After the first network device is created, the transmission medium between the buffer memory and the FIFO memory is determined. That is, a physical attribute of the transmission medium between the buffer memory and the FIFO memory is determined. Therefore, a time interval for transmitting a signal over the transmission medium between the buffer memory and the FIFO memory is a fixed value. Likewise, a time interval for transmitting a signal over the transmission medium that connects the FIFO memory and the egress port is also a fixed value.

S405. The first network device sets a read pointer and/or a write pointer according to the determined first latency.

For example, the setting the read pointer may be specifically setting a value of the read pointer. The setting the write pointer may be specifically setting a value of the write pointer.

For example, the read pointer of the FIFO memory is configured to perform a read operation on a storage unit in the FIFO memory. The write pointer of the FIFO memory is configured to perform a write operation on a storage unit in the FIFO memory.

For example, the first network device may determine, according to the first latency, a storage unit to which the read pointer points, so as to set the value of the read pointer to an address of the storage unit. Alternatively, the first network device may determine, according to the first latency, a storage unit to which the write pointer points, so as to set the value of the write pointer to an address of the storage unit. Alternatively, the first network device may determine, according to the first latency, a storage unit to which the read pointer and the write pointer point, so as to set values of the read pointer and the write pointer to an address of the storage unit.

S406. The first network device writes, according to the set write pointer, the processed packet into a storage unit in the first in first out memory, or reads, according to the set read pointer, the processed packet from a storage unit in the first in first out memory.

For example, after a read operation is performed on the storage unit to which the read pointer of the FIFO memory points, the value of the read pointer is increased by 1. The read pointer whose value is increased by 1 points to a next storage unit from which a packet is to be read.

For example, after a write operation is performed on the storage unit to which the write pointer of the FIFO memory points, the value of the write pointer is increased by 1. The write pointer whose value is increased by 1 points to a next storage unit into which a packet is to be written.

For example, the read operation corresponding to the read pointer and the write operation corresponding to the write pointer may be performed synchronously, or may be performed asynchronously.

For example, the first network device performs a write operation on the storage unit according to the set write pointer, so as to write the processed packet into the storage unit. The first network device performs a read operation on the storage unit according to the set read pointer, so as to read the processed packet from the storage unit.

S407. The first network device forwards, at the third time through the egress port, the processed packet that is read from the first in first out memory.

For example, the FIFO memory performs a read operation to read the processed packet from the storage unit to which the read pointer points.

For example, S407 may be performed by a transmitter circuit. Both the transmitter circuit and the FIFO memory are components of the first network device. The transmitter circuit is coupled to the FIFO memory.

Figure 5:
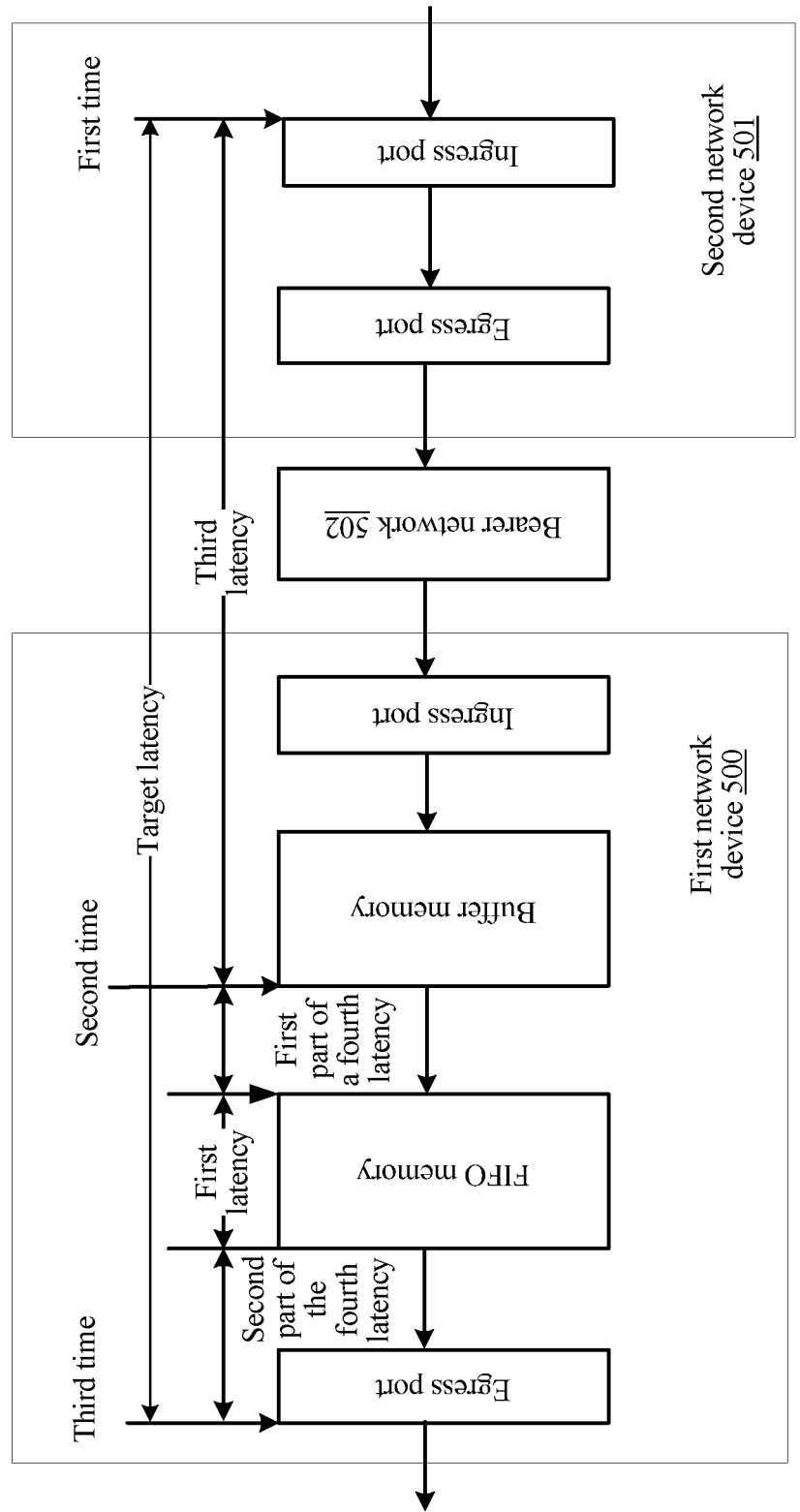
FIG. 5 is a schematic diagram of a latency generated when a packet passes through a second network device and a first network device according to an embodiment of the present invention.

According to an embodiment, FIG. 5 is a schematic diagram of a latency generated when the packet in the method shown in FIG. 4 passes through the second network device and the first network device. Referring to FIG. 5, the second network device 501 receives the packet through an ingress port of the second network device 501. After being forwarded by the second network device 501, the packet passes through a bearer network 502 between the second network device 501 and the first network device 500, and is received by the ingress port of the first network device 500. The target latency is equal to a period from the first time at which the packet is received by the second network device 501 through the ingress port to a third time at which the processed packet is forwarded by the first network device 500 through an egress port. The target latency includes the first latency, the third latency, and the fourth latency.

The third latency is equal to a period from the first time to the second time. The first time is a time at which the first network device 500 receives the packet through the ingress port. The second time is a time at which the first network device 500 reads the processed packet from the buffer memory. During a period from the time at which the ingress port receives the packet to a time at which the packet enters the buffer memory, the first network device processes the packet. For example, the first network device may process the packet by using a network processor (not shown in the figure). In addition, during a period from a time at which the ingress port receives the packet to the time at which the packet enters the buffer memory, the second network device or the bearer network 502 may also process the packet. It should be noted that, in FIG. 5, the bearer network 502 is disposed between the second network device 501 and the first network device 500. In specific implementation, the bearer network 502 may not be disposed between the second network device 501 and the first network device 500. The second network device 501 and the first network device 500 are connected by using only a transmission medium.

The first latency is equal to a period from a time at which the processed packet is written into the FIFO memory to a time at which the processed packet is read from the FIFO memory.

The fourth latency is a fixed latency. The fourth latency includes a first part and a second part. The first part is a period from a time at which the processed packet is read from the buffer memory to a time at which the processed packet is written into the FIFO memory. The second part is equal to a period from the time at which the processed packet is read from the FIFO memory to a time at which the processed packet is forwarded by the egress port.

Figure 6:
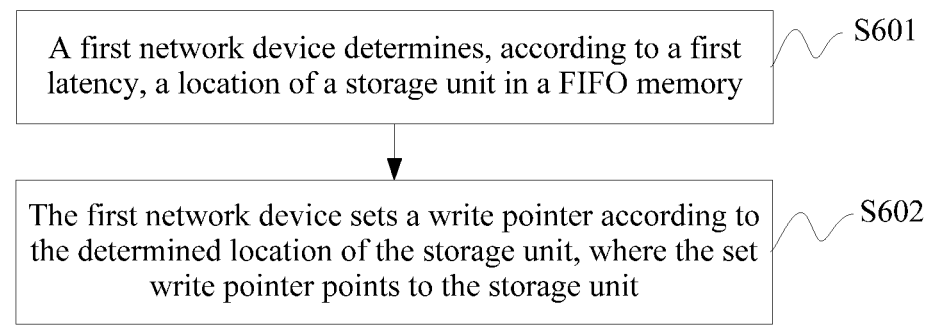
FIG. 6 is a schematic flowchart of a packet processing method according to an embodiment of the present invention.

FIG. 6 is a schematic flowchart of a packet processing method according to an embodiment of the present invention. Referring to FIG. 6, the method includes S601 and S602.

Optionally, in the method shown in FIG. 4, that the first network device sets a write pointer according to the first latency specifically includes the following steps.

S601. The first network device determines, according to the first latency, a location of the storage unit in the FIFO memory.

S602. The first network device sets, according to the determined location of the storage unit, the write pointer to point to the storage unit.

For S601 and S602, refer to FIG. 6 for details.

Optionally, in the method shown in FIG. 6, that the first network device determines, according to the first latency, a location of the storage unit in the FIFO memory specifically includes: determining, by the first network device, the location of the storage unit in the FIFO memory according to the following formula:

$$\text{P\_add} = \left\lceil \frac{T_1}{T_{read}} \right\rceil - 1 \tag{2}$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

Optionally, in the method shown in FIG. 4, the Precision Time Protocol (PTP) or the Network Time Protocol (NTP) is used to perform time synchronization between the first network device and the second network device.

In the foregoing solution, an error, in calculating a target latency, caused by asynchrony between a reference time point of the first network device and a reference time point of the second network device can be avoided.

Optionally, in the method shown in FIG. 4, S401 may be specifically that the first network device receives the packet that is from an RRU.

Optionally, in the method shown in FIG. 4, S401 may be specifically that the first network device receives the packet that is from a BBU.

For example, the first network device is a network device between the BBU and the RRU, and the second network device is the BBU or the RRU. The first network device is configured to connect the BBU and the RRU. Alternatively, multiple RRUs connect to the BBU by using the first network device. In the foregoing solution, it can be avoided that each RRU needs to be directly connected to the BBU by using an optical fiber, which helps reduce optical fibers and reduce costs. In addition, a latency generated when the packet passes through the second network device and the first network device is equal to a target latency, where a value of the target latency may be equal to a fixed value. When multiple packets pass through the second network device and the first network device, the first network device may perform a similar operation on each packet, that is, the first network device may perform operations of S401 to S407 on each packet. Therefore, when being configured to connect the BBU and the RRU, the first network device may be configured to forward a packet that is used to carry a CPRI service, an SDH service, or a PDH service. The foregoing solution can reduce latency variation.

According to the foregoing method, after receiving a packet, a first network device determines, according to a target latency set by the first network device or a second network device, a first latency of a processed packet in a FIFO memory of the first network device, which enables a latency of the packet between the second network device and the first network device to be equal to a preset target latency, thereby avoiding latency variation caused in processes of processing, such as transmitting, storing, forwarding, and exchanging, the packet between the second network device and the first network device.

On the basis of an inventive concept that is the same as that of the foregoing method, an embodiment of the present invention further provides a packet processing apparatus.

Figure 7:
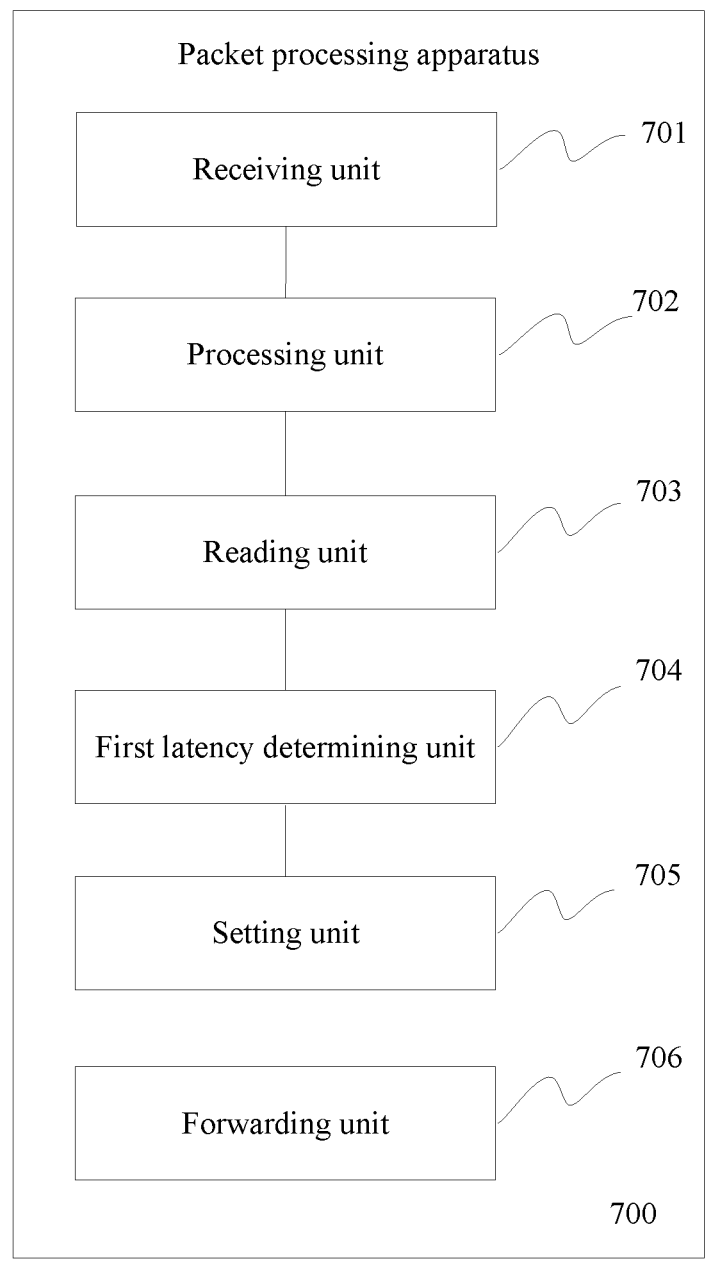
FIG. 7 is a schematic structural diagram of a packet processing apparatus according to an embodiment of the present invention.

FIG. 7 is a schematic structural diagram of a packet processing apparatus according to an embodiment of the present invention. A packet processing apparatus 700 may be configured to perform the method shown in FIG. 1. For example, the packet processing apparatus 700 may be a PTN device, an OTN device, a router, or a switch.

Referring to FIG. 7, the packet processing apparatus 700 includes: a receiving unit 701, a processing unit 702, a reading unit 703, a first latency determining unit 704, a setting unit 705, and a forwarding unit 706.

The receiving unit 701 is configured to receive a packet at a first time;

The receiving unit 701 may be configured to perform S101. For a function and specific implementation of the receiving unit 701, reference may be made to the description of S101 in the embodiment corresponding to the method shown in FIG. 1, and details are not described herein again.

The processing unit 702 is configured to process the packet received by the receiving unit 701 to obtain a processed packet, and write the processed packet into a buffer memory.

The processing unit 702 may be configured to perform S102. For a function and specific implementation of the processing unit 502, reference may be made to the description of S102 in the embodiment corresponding to the method shown in FIG. 1, and details are not described herein again.

The reading unit 703 is configured to read, from the buffer memory at a second time, the processed packet obtained by the processing unit 702.

The reading unit 703 may be configured to perform S103. For a function and specific implementation of the reading unit 703, reference may be made to the description of S103 in the embodiment corresponding to the method shown in FIG. 1, and details are not described herein again.

The first latency determining unit 704 is configured to determine, at a time after the second time, a first latency of the processed packet read by the reading unit 703 in a FIFO memory, where the first latency is equal to a difference obtained by subtracting a second latency from a target latency, the target latency is equal to a period from the first time to a third time at which the processed packet is forwarded by the forwarding unit 706 through an egress port, the second latency is equal to a sum of a third latency and a fourth latency, the third latency is equal to a period from the first time to the second time, the fourth latency is a fixed latency, and the FIFO memory includes multiple contiguous storage units.

The first latency determining unit 704 may be configured to perform S104. For a function and specific implementation of the first latency determining unit 704, reference may be made to the description of S104 in the embodiment corresponding to the method shown in FIG. 1, and details are not described herein again.

The setting unit 705 is configured to: set a read pointer and/or a write pointer according to the first latency determined by the first latency determining unit 704; and write, according to the set write pointer, the processed packet into a storage unit in the FIFO memory, or read, according to the set read pointer, the processed packet from a storage unit in the FIFO memory.

The setting unit 705 may be configured to perform S105. For a function and specific implementation of the setting unit 705, reference may be made to the description of S105 in the embodiment corresponding to the method shown in FIG. 1, and details are not described herein again.

The forwarding unit 706 is configured to forward, at the third time through the egress port, the processed packet that is read from the FIFO memory.

The forwarding unit 706 may be configured to perform S106. For a function and specific implementation of the forwarding unit 706, reference may be made to the description of S106 in the embodiment corresponding to the method shown in FIG. 1, and details are not described herein again.

Optionally, the setting unit 705 is specifically configured to: determine, according to the first latency, a location of the storage unit in the FIFO memory; and set the write pointer according to the determined location of the storage unit, where the set write pointer points to the storage unit.

Optionally, the setting unit 705 is specifically configured to: determine the location of the storage unit in the FIFO memory according to the following formula:

$$P\_add = \left\lceil \frac{T_1}{T_{read}} \right\rceil - 1,$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

Optionally, a clock frequency at which the write pointer performs a write operation on the FIFO memory and a clock frequency at which the read pointer performs a read operation on the FIFO memory are synchronous.

A clock phase at which the write pointer performs a write operation on the FIFO memory and a clock phase at which the read pointer performs a read operation on the FIFO memory are synchronous.

Optionally, the receiving unit 701 is specifically configured to: receive, at the first time, the packet that is from an RRU.

Optionally, the receiving unit 701 is specifically configured to: receive, at the first time, the packet that is from a BBU.

On the basis of an inventive concept that is the same as that of the foregoing method, an embodiment of the present invention further provides a packet processing apparatus.

Figure 8:
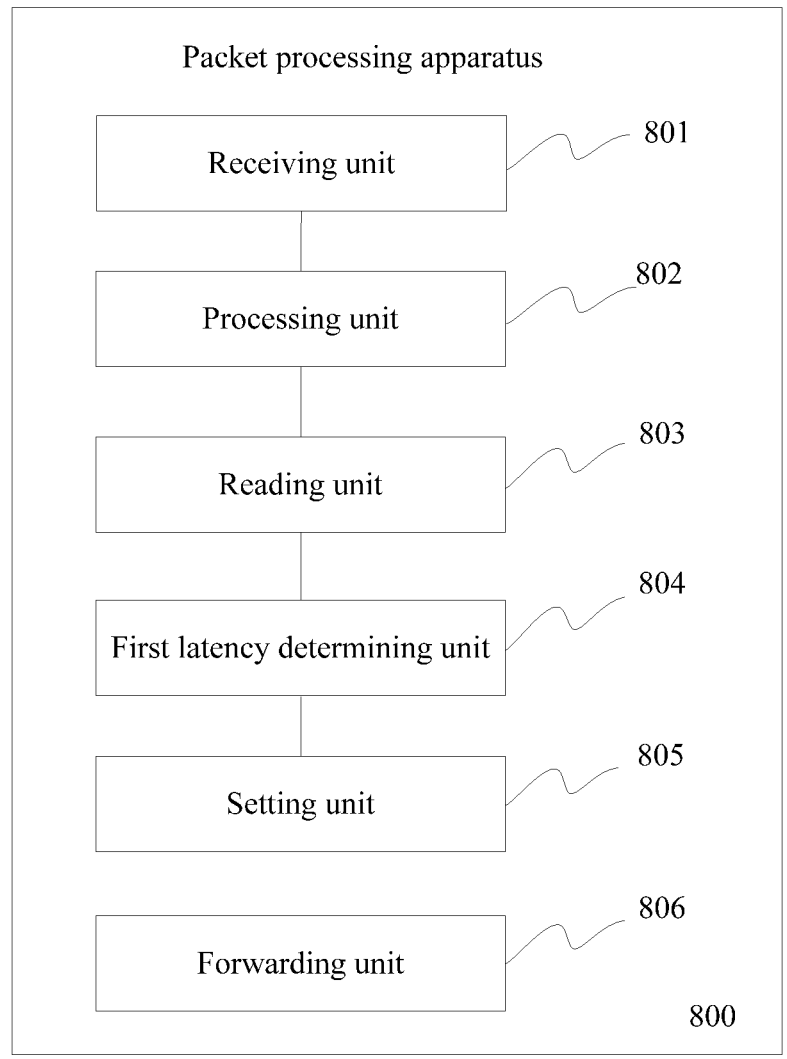
FIG. 8 is a schematic structural diagram of a packet processing apparatus according to an embodiment of the present invention.

FIG. 8 is a schematic structural diagram of a packet processing apparatus according to an embodiment of the present invention. A packet processing apparatus 800 may be configured to perform the method shown in FIG. 4. For example, the packet processing apparatus 800 may be a PTN device, an OTN device, a router, or a switch.

Referring to FIG. 8, the packet processing apparatus 800 includes: a receiving unit 801, a processing unit 802, a reading unit 803, a first latency determining unit 804, a setting unit 805, and a forwarding unit 806.

The receiving unit 801 is configured to receive a packet that is from a second network device, where the packet carries a first time, and the first time is a time at which the second network device receives the packet.

For example, the receiving unit 801 may be configured to perform S401. For a function and specific implementation of the receiving unit 801, reference may be made to the description of S401 in the embodiment corresponding to the method shown in FIG. 4, and details are not described herein again.

The processing unit 802 is configured to process the packet received by the receiving unit 801 to obtain a processed packet, and write the processed packet into a buffer memory.

For example, the processing unit 802 may be configured to perform S402. For a function and specific implementation of the processing unit 802, reference may be made to the description of S402 in the embodiment corresponding to the method shown in FIG. 4, and details are not described herein again.

The reading unit 803 is configured to read, from the buffer memory at a second time, the processed packet obtained by the processing unit 802.

For example, the reading unit 803 may be configured to perform S403. For a function and specific implementation of the reading unit 803, reference may be made to the description of S403 in the embodiment corresponding to the method shown in FIG. 4, and details are not described herein again.

The first latency determining unit 804 is configured to determine, at a time after the second time, a first latency of the processed packet read by the reading unit 803 in a first in first out FIFO memory. The first latency is equal to a difference obtained by subtracting a second latency from a target latency; The target latency is equal to a period from the first time to a third time at which the processed packet is forwarded by the forwarding unit through an egress port. The second latency is equal to a sum of a third latency and a fourth latency. The third latency is equal to a period from the first time to the second time. The fourth latency is a fixed latency, and the FIFO memory includes multiple contiguous storage units.

For example, the first latency determining unit 804 may be configured to perform S404. For a function and specific implementation of the first latency determining unit 804, reference may be made to the description of S404 in the embodiment corresponding to the method shown in FIG. 4, and details are not described herein again.

The setting unit 805 is configured to: set a read pointer and/or a write pointer according to the first latency determined by the first latency determining unit 804; and write, according to the set write pointer, the processed packet into a storage unit in the FIFO memory, or read, according to the set read pointer, the processed packet from a storage unit in the FIFO memory.

For example, the setting unit 805 may be configured to perform S405. For a function and specific implementation of the setting unit 805, reference may be made to the description of S405 in the embodiment corresponding to the method shown in FIG. 4, and details are not described herein again.

The forwarding unit 806 is configured to forward, at the third time through the egress port, the processed packet that is read from the FIFO memory.

For example, the forwarding unit 806 may be configured to perform S406. For a function and specific implementation of the forwarding unit 806, reference may be made to the description of S406 in the embodiment corresponding to the method shown in FIG. 4, and details are not described herein again.

Optionally, the setting unit 805 is specifically configured to: determine a location of the storage unit in the FIFO memory according to the first latency; and set, according to the determined location of the storage unit, the write pointer to point to the storage unit.

Optionally, the setting unit 805 is specifically configured to: determine the location of the storage unit in the FIFO memory according to the following formula:

$$P\_add = \left\lceil \frac{T_1}{T_{read}} \right\rceil - 1,$$

where P_add indicates a quantity of storage units between a first storage unit and a second storage unit, where the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and [•] indicates round-up.

Optionally, the Precision Time Protocol or the Network Time Protocol is used to perform time synchronization between the apparatus and the second network device.

Optionally, the receiving unit 801 is specifically configured to: receive the packet that is from an RRU.

Optionally, the receiving unit 801 is specifically configured to: receive the packet that is from a BBU.

On the basis of an inventive concept that is the same as that of the foregoing method, an embodiment of the present invention further provides a network device.

Figure 9:
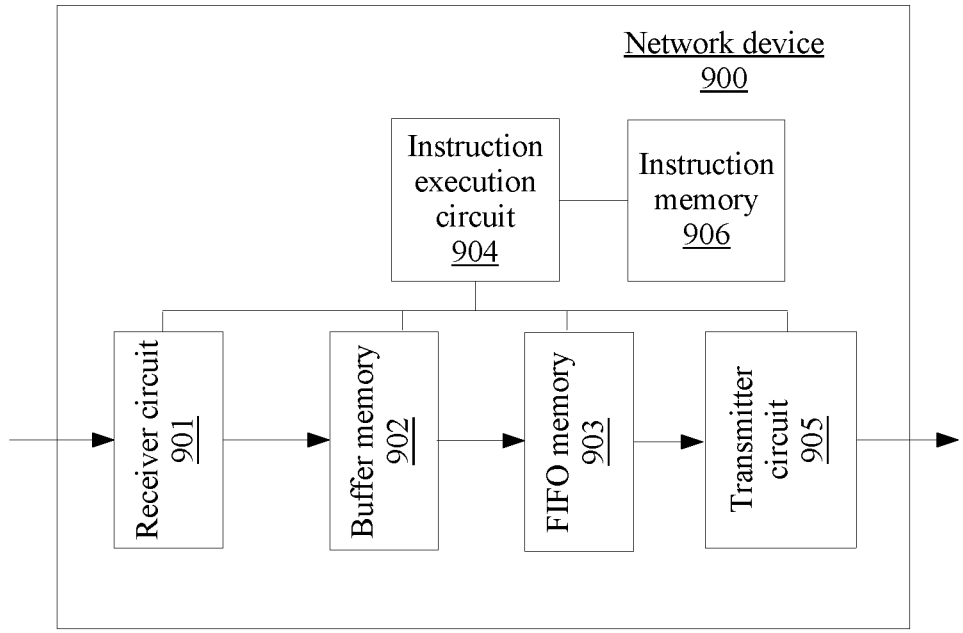
FIG. 9 is a schematic structural diagram of a network device according to an embodiment of the present invention.

FIG. 9 is a schematic structural diagram of a network device according to an embodiment of the present invention. For example, a network device 900 may be a PTN device, an OTN device, a router, or a switch.

Referring to FIG. 9, the network device 900 includes: a receiver circuit 901, a buffer memory 902, a FIFO memory 903, an instruction execution circuit 904, a transmitter circuit 905, and an instruction memory 906.

The instruction execution circuit 904 is coupled to the instruction memory 906. The instruction memory 906 is configured to store a computer instruction. The instruction execution circuit 904 implements a function by reading the computer instruction. For example, the instruction execution circuit 904 implements processing of a packet.

The instruction execution circuit 904 is separately coupled to the receiver circuit 901, the buffer memory 902, the FIFO memory 903, the instruction execution circuit 904, and the transmitter circuit 905. Specifically, the instruction execution circuit 904 may perform a read operation on the receiver circuit 901, so as to acquire data received by the receiver circuit 901. The instruction execution circuit 904 may perform a write operation on the transmitter circuit 905, so as to provide data to the transmitter circuit 905. The instruction execution circuit 904 may perform a read operation and a write operation on the buffer memory 902. The instruction execution circuit 904 may perform a read operation and a write operation on the FIFO memory 903. An output end of the receiver circuit 901 is coupled to an input end of the buffer memory 902. The buffer memory 902 may receive data sent by the receiver circuit 901. An output end of the buffer memory 902 is coupled to an input end of the FIFO memory 903. The FIFO memory 903 may receive data sent by the buffer memory 902. An output end of the FIFO memory 903 is coupled to an input end of the transmitter circuit 905. The transmitter circuit 905 may receive data sent by the FIFO memory 903. The network device 900 may be configured to perform the method shown in FIG. 1. The receiver circuit 901 may be configured to perform S101.

The instruction execution circuit 904 may perform S102 by accessing a computer program in the instruction memory 906, and read a processed packet by accessing the buffer memory 902. The instruction execution circuit 904 may perform S103 by accessing the computer program in the instruction memory 906.

The instruction execution circuit 904 may perform S104 by accessing the computer program in the instruction memory 906.

The instruction execution circuit 904 may perform S105 by accessing the computer program in the instruction memory 906, and perform a write operation and/or a read operation on the FIFO memory 903 by using a write pointer and/or a read pointer. The instruction execution circuit 904 may perform S106 by accessing the computer program in the instruction memory 906.

The transmitter circuit 905 may be configured to perform S107. Specifically, the transmitter circuit 905 may be configured to implement an egress port involved in S107.

The network device 900 may be configured to perform the method shown in FIG. 4. The receiver circuit 901 may be configured to perform S401.

The instruction execution circuit 904 may perform S402 by accessing the computer program in the instruction memory 906, and read a processed packet by accessing the buffer memory 902. The instruction execution circuit 904 may perform S403 by accessing the computer program in the instruction memory 906.

The instruction execution circuit 904 may perform S404 by accessing the computer program in the instruction memory 906.

The instruction execution circuit 904 may perform S405 by accessing the computer program in the instruction memory 906, and perform a write operation and/or a read operation on the FIFO memory 903 by using a write pointer and/or a read pointer. The instruction execution circuit 904 may perform S406 by accessing the computer program in the instruction memory 906.

The transmitter circuit 905 may be configured to perform S407. Specifically, the transmitter circuit 905 may be configured to implement an egress port involved in S407.

Figure 10:
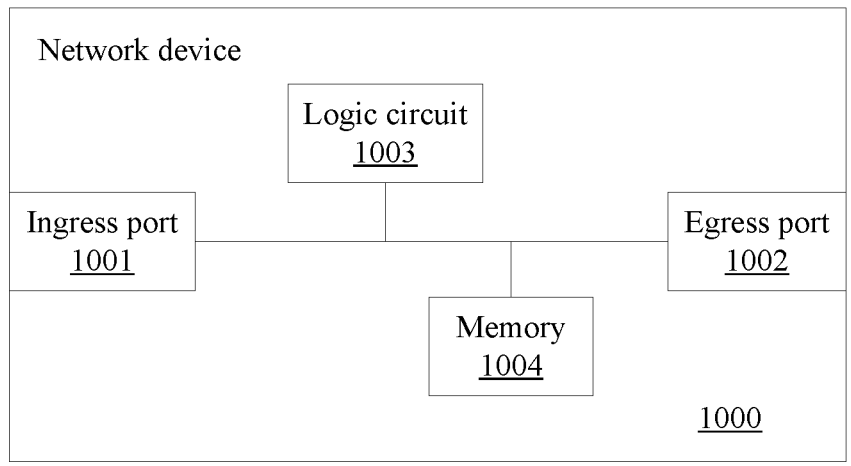
FIG. 10 is a schematic structural diagram of a network device according to an embodiment of the present invention.

FIG. 10 is a schematic structural diagram of a network device according to an embodiment of the present invention. For example, a network device 1000 may be a PTN device, an OTN device, a router, or a switch.

Referring to FIG. 10, the network device 1000 includes: an ingress port 1001, an egress port 1002, a logic circuit 1003, and a memory 1004. The logic circuit 1003 is coupled to the ingress port 1001, the egress port 1002, and the memory 1004 by using a bus. The memory 1004 stores a computer program. The logic circuit 1003 may implement a function by executing the computer program stored by the memory 1004. For example, the logic circuit 1003 implements processing of a packet.

The network apparatus 1000 may be configured to perform the method shown in FIG. 1. The network apparatus 1000 may be configured to implement the first network device involved in the method shown in FIG. 1. The ingress port 1001 may be configured to perform S101. The logic circuit 1003 may perform S102 by accessing the computer program in the memory 1004. The memory 1004 may be configured to implement the buffer memory involved in S102.

The logic circuit 1003 may perform S103 by accessing the computer program in the memory 1004. The logic circuit 1003 may perform S104 by accessing the computer program in the memory 1004. In addition, the memory 1004 may be configured to implement the FIFO memory involved in S104.

The logic circuit 1003 may perform S105 by accessing the computer program in the memory 1004. The logic circuit 1003 may perform S106 by accessing the computer program in the memory 1004.

The egress port 1002 may be configured to perform S1007. Specifically, the egress port 1002 may be configured to implement an egress port involved in S107.

The network apparatus 1000 may be configured to perform the method shown in FIG. 4. The network apparatus 1000 may be configured to implement the first network device involved in the method shown in FIG. 4. The ingress port 1001 may be configured to perform S401. The logic circuit 1003 may perform S402 by accessing the computer program in the memory 1004. The memory 1004 may be configured to implement the buffer memory involved in S402.

The logic circuit 1003 may perform S403 by accessing the computer program in the memory 1004. The logic circuit 1003 may perform S404 by accessing the computer program in the memory 1004. In addition, the memory 1004 may be configured to implement the FIFO memory involved in S404.

The logic circuit 1003 may perform S405 by accessing the computer program in the memory 1004. The logic circuit 1003 may perform S406 by accessing the computer program in the memory 1004.

The egress port 1002 may be configured to perform S407. Specifically, the egress port 1002 may be configured to implement an egress port involved in S407.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art may make modifications and variations to technical solutions provided in embodiments of the present invention. The present invention is intended to cover these modifications and variations provided that they fall within the scope of protection defined by the following claims and their equivalent technologies.

What is claimed is:

1. A method, comprising:
   receiving, by a first network device, a packet at a first time;
   processing, by the first network device, the packet to obtain a processed packet, and writing the processed packet into a buffer memory;
   reading, by the first network device, the processed packet from the buffer memory at a second time;
   determining, by the first network device at a time after the second time, a first latency of the processed packet in a first in first out (FIFO) memory, wherein the first latency is equal to a difference obtained by subtracting a second latency from a target latency, the target latency is equal to a period from the first time to a third time at which the processed packet is forwarded by the first network device through an egress port, the second latency is equal to a sum of a third latency and a fourth latency, the third latency is equal to a period from the first time to the second time, the fourth latency is a fixed latency, and the FIFO memory comprises multiple contiguous storage units;
   setting, by the first network device, a read pointer and/or a write pointer according to the determined first latency;
   writing, by the first network device according to the set write pointer, the processed packet into a storage unit in the FIFO memory, or reading, according to the set read pointer, the processed packet from a storage unit in the FIFO memory; and
   forwarding, by the first network device at the third time through the egress port, the processed packet that is read from the FIFO memory.

2. The method according to claim 1, wherein setting, by the first network device, the write pointer according to the determined first latency comprises:
   determining, by the first network device according to the first latency, a location of the storage unit in the FIFO memory; and
   setting, by the first network device, the write pointer according to the determined location of the storage unit, wherein the set write pointer points to the storage unit.

3. The method according to claim 2, wherein determining, by the first network device according to the first latency, a location of the storage unit in the FIFO memory comprises:
   determining, by the first network device, the location of the storage unit in the FIFO memory according to the following formula:

$$\text{P\_add} = \left\lceil \frac{T_1}{T_{read}} \right\rceil - 1,$$

wherein P_add indicates a quantity of storage units between a first storage unit and a second storage unit, wherein the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

4. The method according to claim 1, wherein a clock frequency at which the write pointer performs a write operation on the FIFO memory and a clock frequency at which the read pointer performs a read operation on the FIFO memory are synchronous; and
wherein a clock phase at which the write pointer performs a write operation on the FIFO memory and a clock phase at which the read pointer performs a read operation on the FIFO memory are synchronous.

5. The method according to claim 1, wherein receiving, by the first network device, the packet at the first time comprises:
receiving, by the first network device at the first time, the packet from a remote radio unit (RRU); or
receiving, by the first network device at the first time, the packet from a baseband unit (BBU).

6. A method, comprising:
receiving, by a first network device, a packet that is from a second network device, wherein the packet carries a first time, and the first time is a time at which the second network device receives the packet;
processing, by the first network device, the packet to obtain a processed packet, and writing the processed packet into a buffer memory;
reading, by the first network device, the processed packet from the buffer memory at a second time;
determining, by the first network device at a time after the second time, a first latency of the processed packet in a first in first out (FIFO) memory, wherein the first latency is equal to a difference obtained by subtracting a second latency from a target latency, the target latency is equal to a period from the first time to a third time at which the processed packet is forwarded by the first network device through an egress port, the second latency is equal to a sum of a third latency and a fourth latency, the third latency is equal to a period from the first time to the second time, the fourth latency is a fixed latency, and the FIFO memory comprises multiple contiguous storage units;
setting, by the first network device, a read pointer and/or a write pointer according to the determined first latency;
writing, by the first network device according to the set write pointer, the processed packet into a storage unit in the FIFO memory, or reading, according to the set read pointer, the processed packet from a storage unit in the FIFO memory; and
forwarding, by the first network device at the third time through the egress port, the processed packet that is read from the FIFO memory.

7. The method according to claim 6, wherein setting, by the first network device, the write pointer according to the first latency comprises:
determining, by the first network device according to the first latency, a location of the storage unit in the FIFO memory; and
setting, by the first network device according to the determined location of the storage unit, the write pointer to point to the storage unit.

8. The method according to claim 7, wherein determining, by the first network device according to the first latency, the location of the storage unit in the FIFO memory comprises:

determining, by the first network device, the location of the storage unit in the FIFO memory according to the following formula:

$$P\_add = \left\lceil \frac{T_1}{T_{read}} \right\rceil - 1,$$

wherein P_add indicates a quantity of storage units between a first storage unit and a second storage unit, wherein the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

9. The method according to claim 6, wherein Precision Time Protocol or Network Time Protocol is used to perform time synchronization between the first network device and the second network device.

10. The method according to claim 6, wherein receiving, by the first network device, the packet comprises:
receiving, by the first network device, the packet from a remote radio unit (RRU); or
receiving, by the first network device, the packet from a baseband unit (BBU).

11. An apparatus, comprising:
a receiver, configured to receive a packet at a first time;
a processor; and
a computer-readable storage medium storing a program to be executed by the processor, the program including instructions for:
processing the packet to obtain a processed packet, and write the processed packet into a buffer memory;
reading, from the buffer memory at a second time, the processed packet;
determining, at a time after the second time, a first latency of the processed packet in a first in first out (FIFO) memory, wherein the first latency is equal to a difference obtained by subtracting a second latency from a target latency, the target latency is equal to a period from the first time to a third time at which the processed packet is forwarded through an egress port, the second latency is equal to a sum of a third latency and a fourth latency, the third latency is equal to a period from the first time to the second time, the fourth latency is a fixed latency, and the FIFO memory comprises multiple contiguous storage units;
setting a read pointer and/or a write pointer according to the first latency;
writing, according to the set write pointer, the processed packet into a storage unit in the FIFO memory, or read, according to the set read pointer, the processed packet from a storage unit in the FIFO memory; and
forwarding, at the third time through the egress port, the processed packet that is read from the FIFO memory.

12. The apparatus according to claim 11, wherein the program further includes instructions for:

determining, according to the first latency, a location of the storage unit in the FIFO memory; and setting the write pointer according to the determined location of the storage unit, wherein the set write pointer points to the storage unit.

13. The apparatus according to claim 12, wherein the program further includes instructions for:

determining the location of the storage unit in the FIFO memory according to the following formula:

$$P\_add = \left\lceil \frac{T_1}{T_{read}} \right\rceil - 1,$$

wherein P_add indicates a quantity of storage units between a first storage unit and a second storage unit, wherein the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

14. The apparatus according to claim 11, wherein a clock frequency at which the write pointer performs a write operation on the FIFO memory and a clock frequency at which the read pointer performs a read operation on the FIFO memory are synchronous; and wherein a clock phase at which the write pointer performs a write operation on the FIFO memory and a clock phase at which the read pointer performs a read operation on the FIFO memory are synchronous.

15. The apparatus according to claim 11, wherein the receiver configured to:

receive, at the first time, the packet from a remote radio unit (RRU); or receive, at the first time, the packet from a baseband unit (BBU).

16. An apparatus, comprising:

a receiver, configured to receive a packet that is from a second network device, wherein the packet carries a first time, and the first time is a time at which the second network device receives the packet;

a processor; and a computer-readable storage medium storing a program to be executed by the processor, the program including instructions for:

processing the packet to obtain a processed packet, and writing the processed packet into a buffer memory;

reading, from the buffer memory at a second time, the processed packet;

determining, at a time after the second time, a first latency of the processed packet in a first in first out (FIFO) memory, wherein the first latency is equal to a difference obtained by subtracting a second latency from a target latency, the target latency is equal to a period from the first time to a third time at which the processed packet is forwarded through an egress port, the second latency is equal to a sum of a third latency and a fourth latency, the third latency is equal to a period from the first time to the second time, the fourth latency is a fixed latency, and the FIFO memory comprises multiple contiguous storage units;

setting a read pointer and/or a write pointer according to the first latency;

writing, according to the set write pointer, the processed packet into a storage unit in the FIFO memory, or reading, according to the set read pointer, the processed packet from a storage unit in the FIFO memory; and forwarding, at the third time through the egress port, the processed packet that is read from the FIFO memory.

17. The apparatus according to claim 16, wherein the program further includes instructions for:

determining, according to the first latency, a location of the storage unit in the FIFO memory; and setting, according to the determined location of the storage unit, the write pointer to point to the storage unit.

18. The apparatus according to claim 17, wherein the program further includes instructions for:

determining the location of the storage unit in the FIFO memory according to the following formula:

$$P\_add = \left\lceil \frac{T_1}{T_{read}} \right\rceil - 1$$

wherein P_add indicates a quantity of storage units between a first storage unit and a second storage unit, wherein the first storage unit and the second storage unit are storage units in the multiple contiguous storage units, the first storage unit is configured to store the processed packet, the multiple contiguous storage units are configured to store a packet queue, each storage unit is configured to store only one packet or null data, and the second storage unit is configured to store a tail of the packet queue; $T_1$ indicates the first latency; $T_{read}$ indicates a clock cycle in which the read pointer performs a read operation on the FIFO memory; and $\lceil \cdot \rceil$ indicates round-up.

19. The apparatus according to claim 16, wherein Precision Time Protocol or Network Time Protocol is used to perform time synchronization between the apparatus and the second network device.

20. The apparatus according to claim 16, wherein the receiver is configured to:

receive the packet from a remote radio unit (RRU); or receive the packet from a baseband unit (BBU).

* * * * *